INVENTOR.
John leBeau Rust
BY
Robert A. Sloman
ATTORNEY

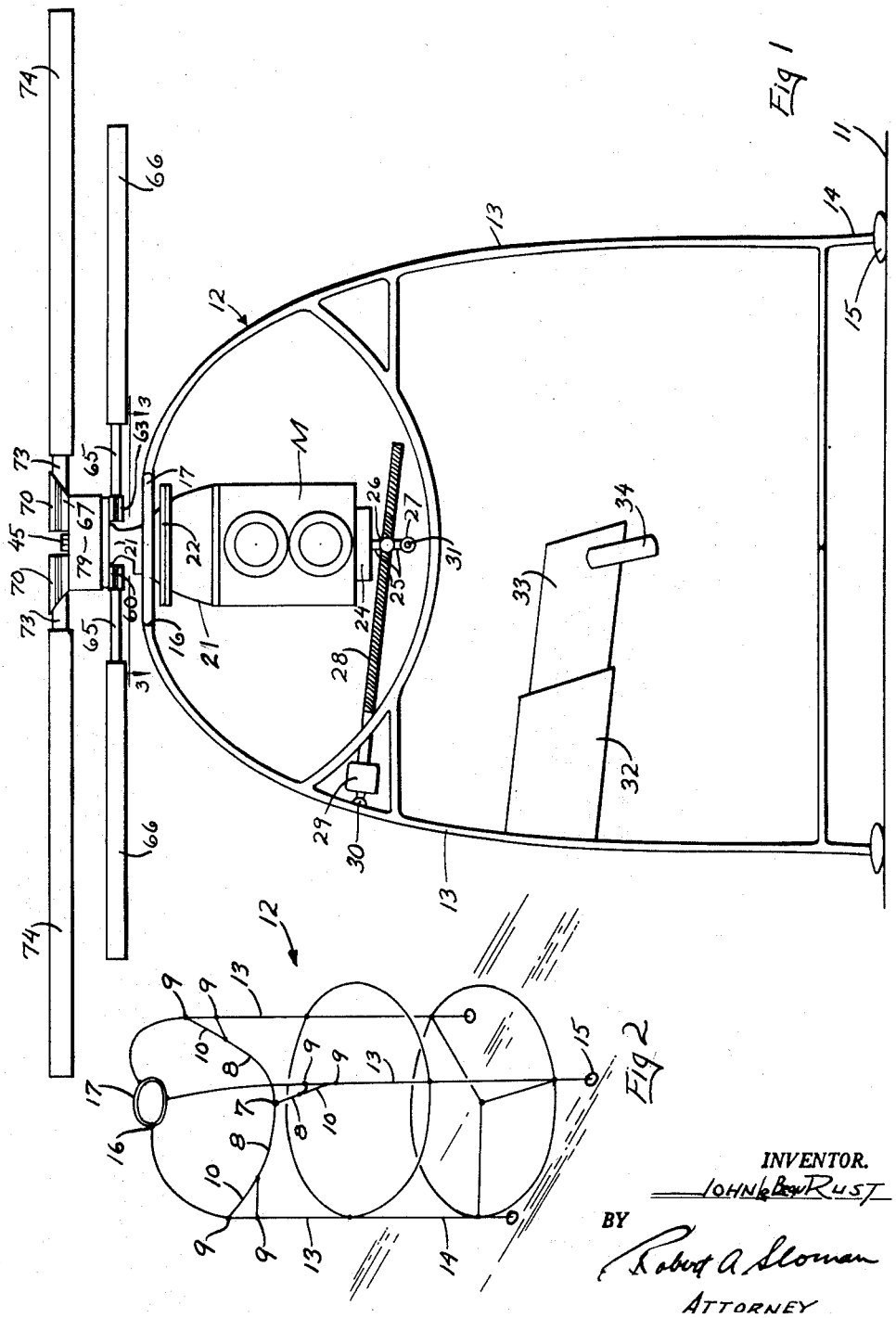

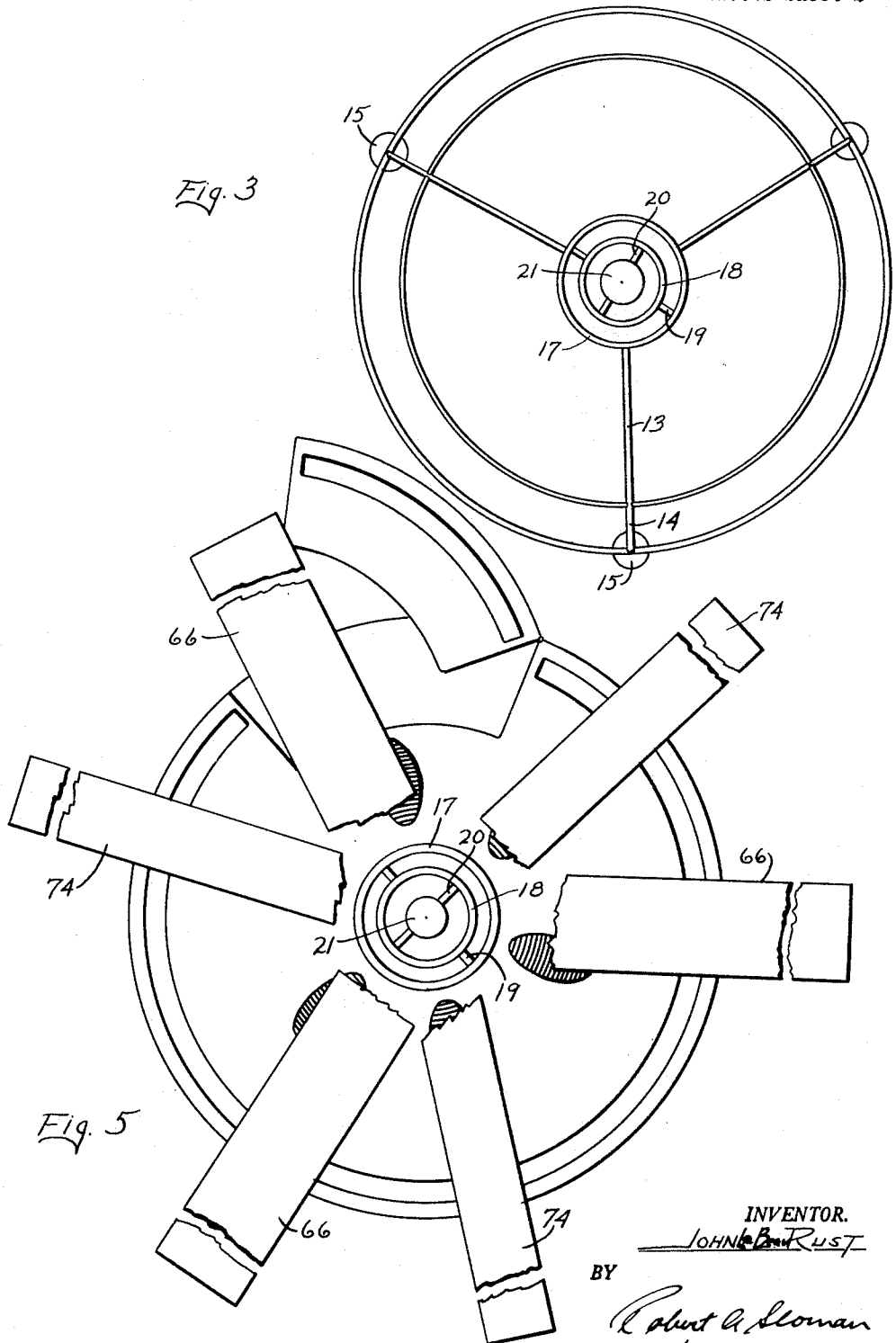

3,018,984
DEVICE FOR PRODUCING RELATIVE MOTION
John Le Beau Rust, 30 E. Philadelphia, Detroit 2, Mich., assignor of one-half to John W. Davidson, Detroit, Mich.
Filed June 20, 1960, Ser. No. 37,512
9 Claims. (Cl. 244—17.19)

The present invention relates to a power mechanism to produce relative motion between three bodies that are connected.

The present invention is directed to a power drive mechanism for aircraft and more particularly to a power drive mechanism for producing opposite torques to a pair of oppositely rotating helicopter blades or air foils for illustration, together with means for introducing a torque differential as desired with respect to the two oppositely rotating blades to thus produce corresponding rotation of a supporting body and to thus produce a steering means.

Normally speaking, the counter rotation of a pair of helicopter blade assemblies if rotated at the same speeds will merely produce a vertical lift by the said sets of blades upon a supported fuselage. If means are introduced for providing a differential torque between the two oppositely rotated rotor blades, such differential torque will causes a gradual rotation of the fuselage with respect to supporting rotors, which turning movement will be maintained as long as the torque differential is maintained.

Accordingly it is a part of the present invention or an object thereof to provide auxiliary power mechanism in association with the power drive mechanism for activating and deactivating mechanism for producing a differential torque, as and when desired to thus achieve a steering action. Once the direction or positioning of the fuselage is achieved, further forward motion in that direction is achieved furthermore by sufficient angular tilting of the blades with respect to the horizontal in a manner well-known in the operation of helicopters.

It is a further object of the present invention to provide a power drive mechanism for the helicopter, or the like, together with an auxiliary engine for introducing the torque differential between the respective oppositively rotating drives of the helicopter blades to thus achieve an orientation of the air frame and main housing.

These and other objects will be seen from the following specification and claims in conjunction with the appended drawings in which:

FIG. 1 is a schematic side elevational view of one form of helicopter as mounted upon the ground surface, and incorporating the present invention.

FIG. 2 is a schematic perspective view of the framework therefor.

FIG. 3 is a top plan view or section taken on line 3—3 of FIG. 1 fragmentarily illustrating said framework.

FIG. 5 is a fragmentary plan view of the helicopter shown in FIG. 1.

Figure 4:
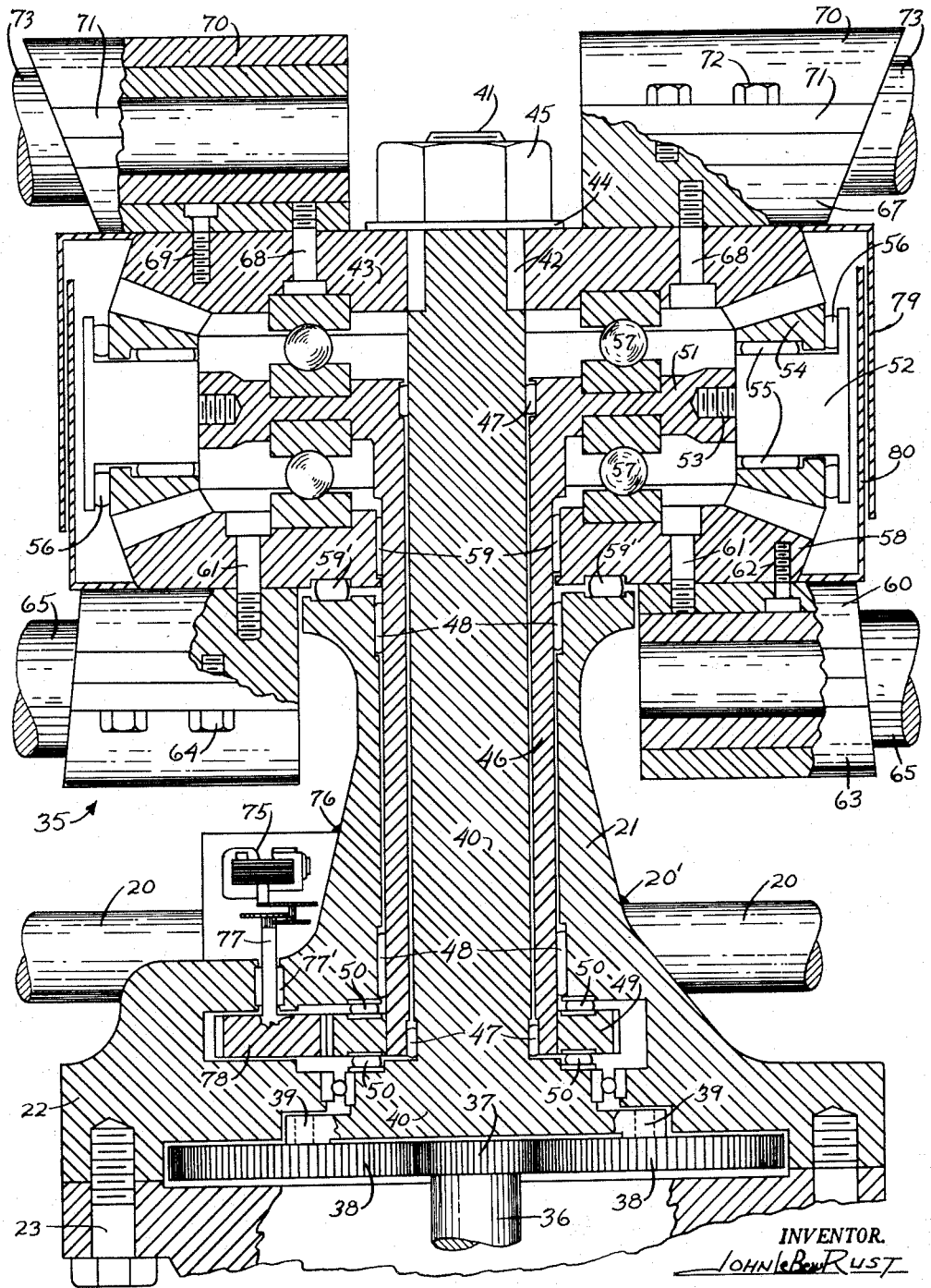
FIG. 4 is a longitudinal section of the power drive mechanism and the auxiliary engine therefor; on an enlarged scale.

It will be understood that the above drawings illustrate merely a preferred embodiment of the invention and that other embodiments are contemplated within the scope of the claims hereafter set forth.

Referring to the drawings and particularly FIGS. 1, 2 and 3, the present airframe, in the form of a helicopter, for illustration, includes, as mounted upon the ground surface 11, the upright framework generally indicated at 12, FIG. 2 and including the three tubular arcuately formed braces 13 whose lower ends terminate in the upright portions 14 with supporting feet 15. The upper ends of the radially spaced tubular supports 13 are curved inwardly and are joined at 16 to the circular frame 17 to thus provide a rigid framework.

Additionally, the framework includes the three V-shaped reinforcing members 10 joined at their free ends as at 9 to portions of the respective tubular members 13 and with their respective inner ends terminating in the central extensions 8 all joined together as at point 7, FIG. 2, completing the framework.

The above described frame 12, at its upper end, has means for the universal mounting and suspension of the main engine M, indicated in FIG. 1.

For this purpose and as specifically shown in FIGS. 1, 3 and 5, the motor mounting ring 18 is swivelly mounted by the oppositely arranged trunnions 19 upon the outer ring 17. A portion of the transmission housing as at 21 extends up through the ring 18 and is swivelly joined to the inner ring 18 by the pair of oppositely arranged trunnion supports 20, which extend at right angles to the first mentioned trunnions 19. This construction provides a universal mounting for the motor M shown in FIG. 1 by which the same may be moved in any direction throughout 360 degrees, as hereafter explained.

The transmission housing 21 has a mounting flange 22 at its lower end as particularly noted in FIG. 4 as well as FIG. 1 for axial connection to the engine housing as by a series of fasteners 23. The control boss 24 projects below the engine M and has swivelly mounted thereunder at 25 the first support 26. The said support 26 has swivelly joined thereunder the second support 27. The rotatable threaded shaft 28 threadedly extends through and operatively engages the universal joint or swivel element 26 and at its opposite end is driven by the first steering motor 29 which is suitably swivelled or otherwise pivotally connected as at 30 to the main framework.

There is provided a second motor similar to motor 29 and arranged substantially 90 degrees therefrom swivelly mounted upon the frame. Inwardly thereof there projects a corresponding second threaded shaft 31 which is threaded through the lower portion of the universal joint 27. By this construction and by virtue of the electric control stick 34 on the telescoping instrument panel 33 within the mounting 32 upon the frame, either or both of the electric motors 29 may be energized simultaneously or separately to thus achieve through the rotation of the respective threaded shafts 28 and 31 the desired angularity of positioning of the engine M with respect to the supporting frame and particularly with respect to its universal mounting at the upper end thereof as best illustrated in FIGS. 1 and 3.

It is this angular tilting of the motor with respect to the frame which adjusts the plane of rotation of the air foils hereafter described for propelling the airframe or fuselage in a predetermined direction longitudinally or horizontally as desired.

*Power drive transmission*

The main engine M, which may be a turbine or internal combustion engine or the like, for illustration, is adapted for operating the power drive transmission means within the housing 21 and which is generally indicated at 35 in FIG. 4.

The propeller shaft or driven shaft 36 from the said engine, as indicated in FIG. 4 carries the gear 37 which is centrally positioned within a series of planetary gears 38 journaled as at 39 upon the central shaft hub 40. Accordingly, the engine provides a means of rotating the main shaft 40 at a speed reduced with respect to the speed of rotation of the engine driven shaft 36.

The main shaft 40 terminates in the threaded shank 41 at its upper end over which is mounted the bevel gear 43 suitably keyed thereto at 42 and secured thereon by a suitable fastener 45 and associated washer 44.

There is a counter rotatable sleeve 46 loosely provisioned upon the shaft 40 with suitable roller bearings 47 interposed between the said shaft and sleeve at the respective upper and lower ends thereof. The said sleeve is furthermore journaled axially within the transmission housing 21, there being suitable additional roller bearings 48 interposed therebetween adjacent upper and lower end portions of the said transmission housing 21.

The sleeve 46 at its lower end has secured thereto the gear 49 suitably keyed thereon, there being suitable thrust bearings 50 arranged above and below and engageable with the said gear 49 and operatively engaging portions of the mainshaft 40 and interior portions of the transmission housing 21.

The upper end of the tubular member 46 carries the transverse annular support 51. The oppositely arranged pinion supports 52, which mount the idler bevel gears or pinions 54 with suitable bearings 55 interposed, are axially projected into and secured to peripheral portions of the support 51 as at mounting points 53, FIG. 4. The said pinion supports have an annular flange at their outer ends and suitable bearings 56 are interposed between the said flanges and outer wall portions of the bevel pinions 54 completing the assembly.

The said pinions 54 on opposite sides of the support 51 are at all times in mesh with the bevel gear 43. There is an additional bevel gear 58 spaced below gear 43 and as well as the support 51 and loosely journaled upon the tubular support 46 with suitable bearings 59 interposed. The said gear 58 and the teeth thereof are in mesh at all times with the idler bevel pinions 54. It is noted also that suitable ball bearings 57 are interposed between upper and lower portions of the support 51 and corresponding portions of the respective bevel gears 43 and 58.

By this construction, rotative power transmitted to the shaft 40 directly drives the bevel gear 43 which through the pinions 54 effects rotation of the second bevel gear 58 in the opposite direction as journaled upon the tubular support 46. Suitable thrust bearings are also employed as at 59' between upper portions of the transmission housing and the bevel gear 58.

As illustrated in FIG. 5, there are three substantially radial rotor blades 66 mounted and secured upon the bevel gear 58 adapted for rotation in one direction; and upon the upper bevel gear 43 there are provisioned an additional set of three radially extending rotor blades 74 as will be hereafter described.

For the purpose of mounting the said blades upon the respective gears 43 and 58 there is provided upon the lower bevel gear 58 the radially extending spaced semi-cylindrical support members 60 suitably secured as by fasteners 61 and 62 to portions of the bevel gear 58 as best illustrated in FIG. 4. The tubular supports 65 which axially mount the respective rotor blades 66, FIG. 1, are nested within the respective semi-cylindrical supports 60 and fixedly retained thereon by the opposing semi-cylindrical top housings 63 whose flanges are joined to corresponding flanges of the bottom housing 60 by the fasteners 64. Thus means are provided for assembling the preferably three rotor blades upon the rotative bevel gear 58 for rotation in one direction.

A corresponding arrangement is provided upon the upper surface of the bevel gear 43. For this purpose there is provided a series of radially extending semi-cylindrical support members 67 fixedly secured to portions of the bevel gear 43 as by the fasteners 68 and 69. The supports 73 for the upper rotor blades 74 are nested within the semi-cylindrical support members 67 and retained thereon by the oppositely arranged top supporting members 70 which are also of semi-cylindrical shape and are provided with fastening flanges 71 by which the two support members are fixedly secured together as by the fasteners 72 so as to tightly retain supporting shafts 73 for the respective rotor blades 74.

This provides at least one illustrative means of mounting the two sets of rotor blades 66 and 74. As above described, the foregoing transmission provides a means of rotating the upper rotor blades 74 in one direction and the lower rotor blades 66 in the opposite direction, but at the same speed.

The supporting trunnions 20 above described with respect to FIG. 3 and joined to the inner ring 18, FIG. 3 are fixedly joined as indicated at 20' by the welds to portions of the transmission housing 21, FIG. 4.

*Auxiliary steering control engine*

Schematically shown in FIG. 4 there is mounted upon the transmission housing 21 and suitably secured thereto at 76 the auxiliary engine 75, which may be an electric engine or other type of engine mounting the driven shaft 77 carrying and having secured thereto upon the interior of the transmission housing 21 the gear 78 in mesh the gear 49 secured to the lower end of the tube 46 journaled upon and within the transmission housing. It is noted however, that a suitable bearing means is interposed between shaft 77 and housing 21 as indicated at 77'.

In normal operation, when the engine is driving the shaft 40 at the reduced speed due to the planetary gear system 37—38—39, the gears 43 and 58 are rotating at the same speed and in opposite directions.

The purpose of the auxiliary engine 75 is to provide a means of establishing a differential speed of rotation between gear 58 and the power driven gear 43. Accordingly, by rotating the gear 78 in one direction there is effected a relative rotation of the pinion support 51 with respect to the powershaft 40 causing an increase in the speed of rotation of the gear 58 with respect to the speed of rotation of the gear 43.

If the motor 75 drives the shaft 77 in the opposite direction, then the speed of rotation of the gear 58 is reduced with respect to the constant speed of the power-driven bevel gear 43. In other words, rotation of the bevel gears 54 in one direction by rotation of its tubular support 46 about a vertical axis causes a relative speed up of rotation of gear 58 with respect to gear 43. However, rotation in the opposite direction of the tubular support 46 as driven by the engine 75 will have the effect of reducing the relative speed or rotation of gear 58 with respect to the fixed speed of rotation of gear 43.

Thus, this differential of speeds between the two gears 43 and 58 will produce a torque differential in one direction or the other which is effective upon the transmission housing and engine connected thereto to thus provide a relative rotation of the fuselage or airframe to thus determine the new direction of flight. As long as the differential is maintained, the airframe will continue to rotate about its upright axis. However, it will stop rotating when the engine 75 is deactivated.

Thereafter to effect a longitudinal flight or a horizontal flight, the engine M must be tipped under the control of the electric control stick 34 by the operator to thus selectively energize the steering control motors 29 by which the engine is pitched to the desired direction throughout 360 degrees. This relative tilting of the engine and the corresponding airfoils thus provides a means whereby the longitudinal drive is effected upon the airframe for moving it in the direction selected.

As above described, in normal operation, with the auxiliary engine 75 deactivated, the two bevel gears 43 and 58 and the associated rotor blades will be rotating in opposite directions but at the same speed.

If the circular support plate 51 which supports the idler pinions 54 is rotated about an upright axis using said auxiliary engine, the gear 58 will either speed up or slow down with respect to the gear 43, depending upon whether the circular plate rotation is with or against the gear in rotation. Whenever the gear 58 is made to speed up or slow down with respect to the gear 43, there will be a changing unbalanced torque in the total system about the vertical axis. This changing unbalancing torque will impart a changing rotation to the main housing. This housing and the main housing can thus be made to rotate in either direction.

In the present preferred illustrative embodiment of the invention using counter-rotating helicopter blades with one set of blades secured to the gear 43 and the other set secured to the gear 58, the airframe or fuselage is joined to the main housing and to the engine M. Using the auxiliary engine 75, the airframe may be oriented in any desired direction about the longitudinal axis of the transmission 21.

As shown in FIG. 4, there is provided a cup-shaped enclosure 80 for gear 58 and pinions 54, and concentrically mounted thereover an additional outer enclosure 79 for gear 43.

Having described my invention, reference should now be had to the following claims:

I claim:
1. In combination, a transmission housing, an elongated sleeve journaled therein and projecting therefrom, an annular support plate mounted transversely on the outer end of the sleeve, a power driven shaft journaled within said housing and sleeve and projecting from said sleeve, a pair of opposed spaced transverse first and second bevel gears, the first bevel gear secured to the free end of said shaft and the second bevel gear journaled on said sleeve and bearing on said housing, opposed bevel pinion gears journaled on said support plate for rotation on an axis at right angles to the shaft axis, said pinions interposed between and enmeshed with said bevel gears, whereby the first gear causes rotation of the second gear at the same speed and in the opposite direction, an auxiliary reversible engine mounted on said housing including a driveshaft extending into said housing, and gear means interconnecting said latter driveshaft and said sleeve for effecting relative rotation of said support plate and pinions about the shaft axis, and producing a torque differential between the speeds of rotation of said bevel gears applied to said housing.

2. In the combination of claim 1, said second gear rotating faster than said first gear when said support plate is driven in the same direction as said second gear, applying said differential torque in one direction, and slower than said first gear when said support plate is driven in opposition to the direction of rotation of said second gear, applying said differential torque in the opposite direction.

3. In the combination of claim 1, said gear means including a gear secured upon the inner end of said sleeve and bearing on one side of said housing and on its opposite side against said power driven shaft within said housing, and a drive gear on the driveshaft of the auxiliary engine enmeshed with said sleeve gear.

4. In the combination of claim 1, an airframe, and universal mounting means joining said transmission housing to said airframe.

5. In the combination of claim 1, an airframe, including a circular mounting ring, a second ring concentrically positioned within said mounting ring and swivelly mounted therein on a first axis, said transmission housing projecting into said second ring and swivelly mounted therein on an axis at right angles to said last mentioned first axis, said differential torque applied to said transmission housing being transmitted to said swivel mountings and to said airframe.

6. In the combination of claim 1, an airframe including a circular mounting ring, a second ring concentrically positioned within said mounting ring and swivelly mounted therein on a first axis, said transmission housing projecting into said second ring and swivelly mounted therein on an axis at right angles to said last mentioned first axis, said differential torque applied to said transmission housing being transmitted to said swivel mountings and to said arframe, and an engine mounted on and suspended from said transmission housing and including a propeller shaft joined to said driven shaft.

7. In the combination of claim 1, an airframe, including a circular mounting ring, a second ring concentrically positioned within said mounting ring and swivelly mounted therein on a first axis, said transmission housing projecting into said second ring and swivelly mounted therein on an axis at right angles to said last mentioned first axis, said differential torque applied to said transmission housing being transmitted to said swivel mountings and to said airframe, an engine mounted on and suspended from said transmission housing and including a propeller shaft joined to said driven shaft, and power means on said airframe joined to said engine for regulating its angularity throughout 360 degrees.

8. In the combination of claim 1, an airframe, including a circular mounting ring, a second ring concentrically positioned within said mounting ring and swivelly mounted therein on a first axis, said transmission housing projecting into said second ring and swivelly mounted therein on an axis at right angles to said last mentioned first axis, said differential torque applied to said transmission housing being transmitted to said swivel mountings and to said airframe, an engine mounted on and suspended from said transmission housing and including a propeller shaft joined to said driven shaft, power means on said airframe joined to said engine for regulating its angulartiy throughout 360 degrees, said power means including a pair of 90 degree spaced reversible motors swivelly mounted on said airframe, each motor including a shaft threadedly and universally engaging said engine, whereby rotation of said shafts separately and simultaneously in the same and in different directions produces selective angular positioning of said engine throughout 360 degrees.

9. In the combination of claim 1, a series of spaced radial supports secured upon each of said bevel gears, and corresponding airfoils mounted on and projecting radially outward from each of said radial supports.

References Cited in the file of this patent
UNITED STATES PATENTS

| | | |
|---|---|---|
| 2,037,745 | Vaughn | Apr. 21, 1936 |
| 2,418,407 | Hays | Apr. 1, 1947 |